(12) United States Patent
Fluch

(10) Patent No.: US 10,391,741 B2
(45) Date of Patent: Aug. 27, 2019

(54) LAMINATED CORE AND METHOD FOR CONNECTING SHEET METAL PARTS TO FORM A LAMINATED CORE

(71) Applicant: VOESTALPINE STAHL GMBH, Linz (AT)

(72) Inventor: Ronald Fluch, Linz (AT)

(73) Assignee: voestalpine Stahl GmbH, Linz (AT)

( * ) Notice: Subject to any disclaimer, the term of this patent is extended or adjusted under 35 U.S.C. 154(b) by 589 days.

(21) Appl. No.: 14/651,462

(22) PCT Filed: Dec. 11, 2013

(86) PCT No.: PCT/AT2013/050246
§ 371 (c)(1),
(2) Date: Jun. 11, 2015

(87) PCT Pub. No.: WO2014/089593
PCT Pub. Date: Jun. 19, 2014

(65) Prior Publication Data
US 2015/0314563 A1    Nov. 5, 2015

(30) Foreign Application Priority Data

Dec. 11, 2012  (AT) .............................. A 50576/2012

(51) Int. Cl.
*B32B 7/12*     (2006.01)
*B32B 23/04*    (2006.01)
(Continued)

(52) U.S. Cl.
CPC .............. *B32B 7/12* (2013.01); *B32B 15/08* (2013.01); *B32B 23/042* (2013.01); *B32B 23/22* (2013.01);
(Continued)

(58) Field of Classification Search
CPC ......... B32B 7/12; B32B 23/042; B32B 37/12; B32B 37/18; B32B 38/0004; Y10T 156/1062
See application file for complete search history.

(56) References Cited

U.S. PATENT DOCUMENTS 3,528,867 A * 9/1970 Heller, Jr. ............... B29C 65/02
                                                      156/272.4
4,980,410 A * 12/1990 Fryd ..................... C08F 220/12
                                                      524/510
(Continued)

FOREIGN PATENT DOCUMENTS

DE    1096476 B    1/1961
DE    1212240 B    3/1966
(Continued)

*Primary Examiner* — Mark A Osele
*Assistant Examiner* — Christopher C Caillouet

(57) ABSTRACT

A laminated core and a method for connecting sheet metal parts to form a laminated core, wherein sheet metal parts are separated from a sheet metal strip having, at least in some regions, a layer of curable polymer adhesive, and the sheet metal parts with adhesive-coated sides facing one another are provided above one another and are bonded under pressure to form a laminated core. In order to create advantageous method conditions, according to the invention a mixture comprising water and a thermoplastic and/or cross-linkable adhesion promoter is provided on at least one of the adhesive layers facing one another during bonding of the sheet metal parts.

12 Claims, 2 Drawing Sheets

(51) Int. Cl.
- *B32B 38/00* (2006.01)
- *B32B 37/18* (2006.01)
- *B32B 15/08* (2006.01)
- *H02K 1/04* (2006.01)
- *H02K 15/02* (2006.01)
- *H01F 3/02* (2006.01)
- *B32B 23/22* (2006.01)
- *B32B 27/16* (2006.01)
- *B32B 27/30* (2006.01)
- *H01F 1/18* (2006.01)
- *H02K 15/12* (2006.01)

(52) U.S. Cl.
CPC .......... *B32B 27/16* (2013.01); *B32B 27/306* (2013.01); *B32B 37/18* (2013.01); *B32B 38/0004* (2013.01); *H01F 3/02* (2013.01); *H02K 1/04* (2013.01); *H02K 15/02* (2013.01); *B32B 2307/54* (2013.01); *B32B 2311/00* (2013.01); *B32B 2457/00* (2013.01); *H01F 1/18* (2013.01); *H02K 15/12* (2013.01); *Y10T 156/1062* (2015.01); *Y10T 428/31678* (2015.04)

(56) References Cited

U.S. PATENT DOCUMENTS

| | | | |
|---|---|---|---|
| 2007/0207186 A1* | 9/2007 | Scanlon | A61F 2/07 424/424 |
| 2009/0151748 A1* | 6/2009 | Ridenhour | B08B 7/00 134/6 |
| 2010/0136350 A1* | 6/2010 | Inaba | B32B 7/12 428/447 |
| 2012/0190790 A1* | 7/2012 | Yamaguchi | B32B 7/12 524/591 |
| 2013/0248100 A1* | 9/2013 | Peruzzi | B32B 37/12 156/264 |

FOREIGN PATENT DOCUMENTS

| | | |
|---|---|---|
| DE | 1225753 B | 9/1966 |
| EP | 0141187 A1 | 5/1985 |
| EP | 1679727 A1 | 7/2006 |
| EP | 2450189 A1 | 5/2012 |
| JP | H02208034 | 8/1990 |
| WO | 2010109272 A2 | 9/2010 |
| WO | 2012059588 A1 | 5/2012 |

* cited by examiner though the hardening of the adhesive layers, in particular of the bonding varnish, of the laminated core in the course of its use is also conceivable. Heat of electrical machines resulting from power loss can entirely suffice to conclude the hardening of the laminated core. Therefore by means of the method of the invention, not only can replicably sturdy laminated cores be produced, but economical production can thus also be enabled, at comparatively little expenditure of energy.

LAMINATED CORE AND METHOD FOR CONNECTING SHEET METAL PARTS TO FORM A LAMINATED CORE

FIELD OF THE INVENTION

The invention relates to a laminated core and a method for connecting sheet metal parts to form a laminated core, in which sheet metal parts are separated from a sheet metal strip having an at least regional curable polymer adhesive layer; the sheet metal parts are provided one above the other with adhesive-coated sides facing one another and are connected in materially bonded fashion under pressure to form a laminated core.

BACKGROUND OF THE INVENTION

To make it possible for sheet metal parts that have a coating of bonding varnish to be connected in materially bonded fashion to form a laminated core, it is known from the prior art (WO 2012/059588 A1) to heat the bonding varnish by means of heat and thus to activate it in order to adhesively bond it under pressure to adjacent sheet metal parts or their bonding varnish. Moreover, in order to ensure mechanical stability of the laminated core, which can be used as a stator/rotor for high-speed electrical machines, the adhesive layer between the sheet metal parts are subjected to a concluding hardening operation, for instance in an oven. Disadvantageously, this kind of production requires a not inconsiderable expenditure of time and energy.

SUMMARY OF THE INVENTION

It is therefore the object of the invention, based on the prior art discussed above, to create a method with which a sturdy laminated core can be produced in an energy-efficient way. Moreover, the method should be capable of being performed replicably and should offer advantages because it is very fast.

The invention attains this object in that on at least one of the adhesive layers facing one another in the process of materially bonded connecting of the sheet metal parts, a mixture having water and a thermoplastic and/or cross-linkable adhesion promoter is provided.

If a mixture having water and a thermoplastic and/or cross-linkable adhesion promoter is provided on at least one of the adhesive layers, facing one another, in the materially bonded connection of the sheet metal parts, then special provisions for hardening the laminated core can be dispensed with, and an extremely sturdy laminated core can be created in energy-saving way. Specifically, it has surprisingly been found that because of the moistening of the adhesive layer with water and its reaction with the adhesion promoter, a sufficiently pretreated boundary layer can be created, with which another adhesive layer or the adhesion promoter of the other adhesive layer can bond. The joining together of the sheet metal parts under pressure in accordance with the invention can now suffice entirely to ensure a mechanically heavy-duty materially bonded connection between the adhesive layers. These advantages are demonstrated particularly in adhesive layers of bonding varnish, which with the aid of water are at least partly plasticized and thus exhibit an especially strong reaction with the adhesion promoter, especially if the latter comprises polyvinyl alcohol. Since in contrast to the prior art, adequate mechanical stability of the laminated core can be ensured by the materially bonded joining under pressure itself, hardening of the In general, it is noted that the term bonding varnish is known to encompass polyvinyl butyral, polyamide, polyester, modified polyamides, etc. Moreover, it is noted in general that the term adhesion promoter can be understood to mean all substances that are used for improving the adhesive strength of bonds. Therefore an adhesion promoter can be understood to include not only a polyvinyl alcohol but also an amine with a cross-linking reaction to improve the adhesion of bonds.

It can be advantageous if the adhesion promoter is water-soluble, in order to create an adhesion promoter layer of nanoscale layer thickness on the adhesive layer. This can ensure a comparatively high reactability in the process of joining under pressure. Moreover, the method can be simplified and/or made replicable if the adhesive layer comprises bonding varnish and/or the adhesive layer is provided on both sides of the sheet metal strip, and/or the sheet metal parts are separated from the sheet metal strip by being stamped out.

The method conditions can be further simplified by drying the mixture before the materially bonded connection of the sheet metal parts. Thus not only can the distribution of the adhesion promoter, or its layer thickness, be securely set, but these parameters continue to be assured even in the process of joining the sheet metal parts together under pressure.

If the mixture is applied to the sheet metal strip before the sheet metal parts are separated, an application of the adhesion promoter even in the peripheral regions of the sheet metal parts can be ensured. This kind of full-surface moistening of the adhesive layer can thus lead to mechanically especially heavy-duty laminated cores.

The sheet metal parts can be joined together securely if the adhesion promoter is activated immediately prior to connecting the sheet metal parts in materially bonded fashion.

If the adhesion promoter and the adhesive layer are activated simultaneously, the bonding of the adhesion promoter to the adhesive layer can be improved. By means of the activation of the adhesive layer, the increased wettability of its surface can in fact be utilized for physically binding the adhesion promoter better to the adhesive layer.

In a way that it is optimized in terms of process, the adhesion promoter and/or the adhesive layer can be activated prior to the separation of the sheet metal part from the sheet metal strip. Moreover, the method step of activation can be shifted to a time range that is less critical in terms of the method, which can make the method easier to handle. Especially if parts are separated from the sheet metal strip multiple times, in order to produce the dimensions of the sheet metal part to be separated, then the activation can be done in an easily handled manner between these separation steps.

If the sheet metal parts are separated from a sheet metal strip having an adhesive layer provided over the full surface on both sides of the sheet metal strip, the handling of the method with regard to introducing an adhesion promoter layer between two adhesive layers can be facilitated considerably. In this way, a reduction in production costs can be achieved.

Connecting the sheet metal parts can be made possible if the sheet metal parts, stacked one above the other in column form below the separator mechanism, connect to one another in materially bonded fashion under the pressure of the separator mechanism.

To ensure sturdy materially bonded joining of the sheet metal parts, the separator mechanism can form a brake for the separated sheet metal parts. To that end, the sheet metal parts are stacked one above another in a line that exerts a resistance to the migration of the sheet metal parts in the line.

An adhesion promoter of polyvinyl alcohol can prove especially advantageous for creating a relatively thin adhesion promoter layer on the adhesive layer. Moreover, especially high chemical/physical reactivity of the adhesion promoter of polyvinyl alcohol with bonding varnish has been found, which can make mechanically extremely heavy-duty laminated cores possible. Alternatively, an adhesion promoter of a cellulose compound, in particular carboxymethylcellulose, is also conceivable.

If fillers are added to the mixture, then among other things the amount of adhesion promoter required can be reduced. It is furthermore possible to achieve an improved connection of the adhesive layers and thus to achieve a mechanically heavier-duty laminated core. With regard to the method step of activation as well, fillers can be used in a purposeful way. Moreover, kaolin can excel as a filler in an adhesion promoter layer that is provided between adhesive layers that comprise bonding varnish. Other fillers are conceivable and are therefore not precluded.

Because a reaction accelerator, in particular water-soluble, is added to the mixture, the chemical reaction between the polymer adhesive layers and the adhesion promoter can be improved markedly. In particular, the use of 2-methylimidizole as a reaction accelerator has proved advantageous with bonding varnish adhesive layers. If a water-soluble cross-linking agent, especially melamine-based, is added to the mixture, the cross-linking of the polymer can be enhanced considerably. Partly etherified melamine resin, in particular, has gained distinction in the use of adhesive layers of bonding varnish. It is furthermore conceivable for a water-dispersible cross-linking agent, in particular isocyanate-based, such as isophorone diisocyanate, to be added to the mixture.

It is furthermore the object of the invention to create a laminated core which, despite its high mechanical strength, can be produced in an energy-saving way.

The invention attains this object in terms of the laminated core in that an adhesion promoter is provided between two adhesive layers.

If an adhesion promoter is provided between two adhesive layers, then in contrast to the prior art, a separate hardening step in the continuous production process of the laminated core can be dispensed with. Specifically, the adhesion promoter layer can ensure adequate mechanical strength of the laminated core. Moreover, because of the mechanical strength that can be achieved by providing the adhesion promoter layer, the moment when the complete hardening of the laminated core takes place can be shifted from the production process to the technical usage of the laminated core. A thermoplastic and/or cross-linkable adhesion promoter is conceivable for this purpose. As a result, a laminated core that can be economically produced can be created.

An especially advantageous materially bonded connection can result if the adhesive layers comprise bonding varnish.

As the adhesion promoter, polyvinyl alcohol can excel, in order to generate an especially strong reaction with the adhesive layer.

Structural simplicity of the laminated core can be made possible if one adhesive layer is provided on each sheet metal part.

Moreover, the invention can be especially distinguished over the prior art if a water-soluble thermoplastic adhesion promoter, in particular polyvinyl alcohol, for forming a materially bonded connection between two curable polymer adhesive layers, in particular comprising bonding varnish, each applied to one sheet metal part, is employed in the production of a laminated core for electromagnetic components.

The aforementioned usage can be improved if a mixture having water and adhesion promoter is applied.

BRIEF DESCRIPTION OF THE DRAWINGS

In the drawings, the subject of the invention is shown as an example in terms of an exemplary embodiment. In the drawings.

DETAILED DESCRIPTION OF THE PREFERRED EMBODIMENTS

Figure 1:
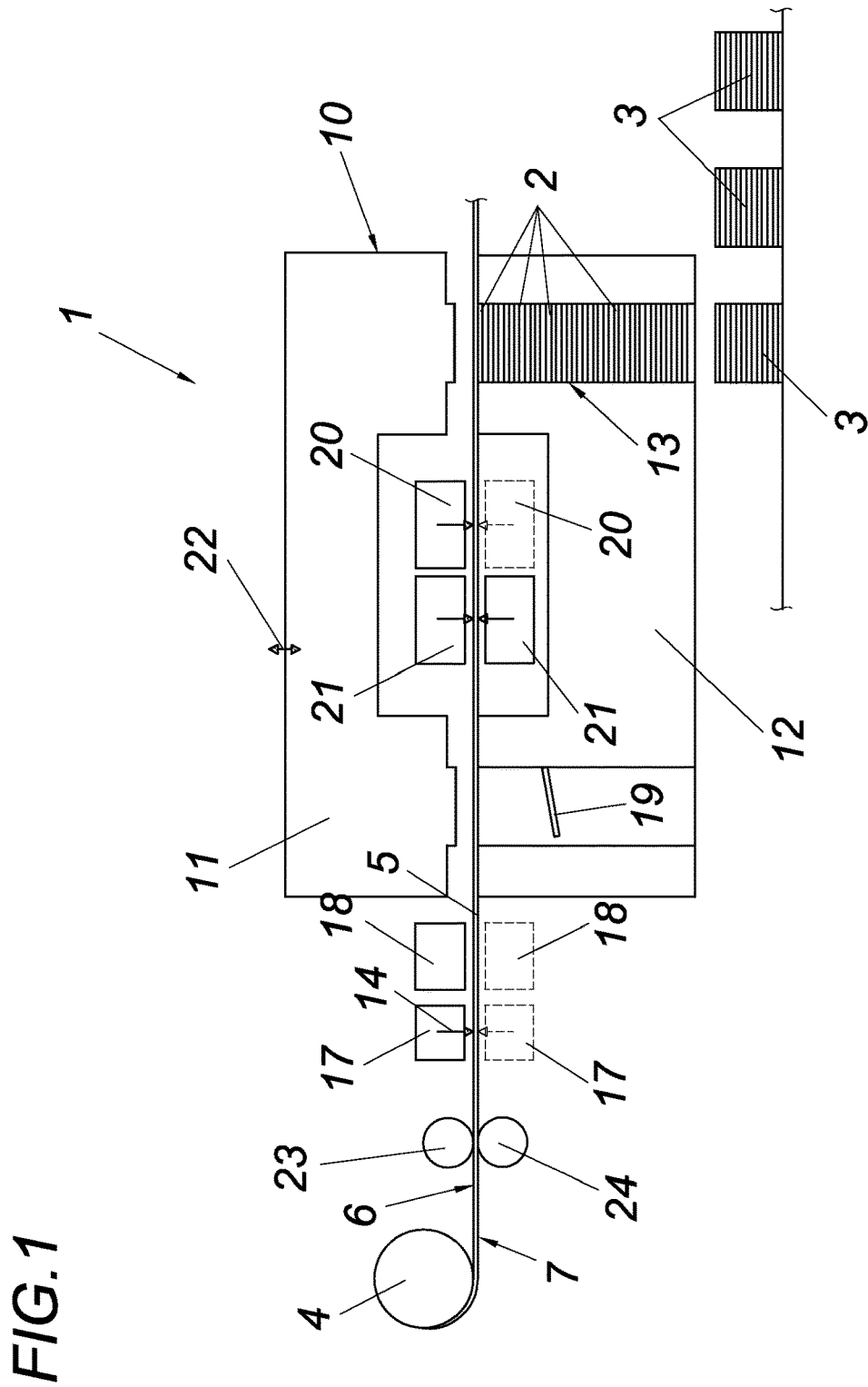
FIG. 1 is a schematic view on an apparatus for producing a laminated core.
Figure 2:
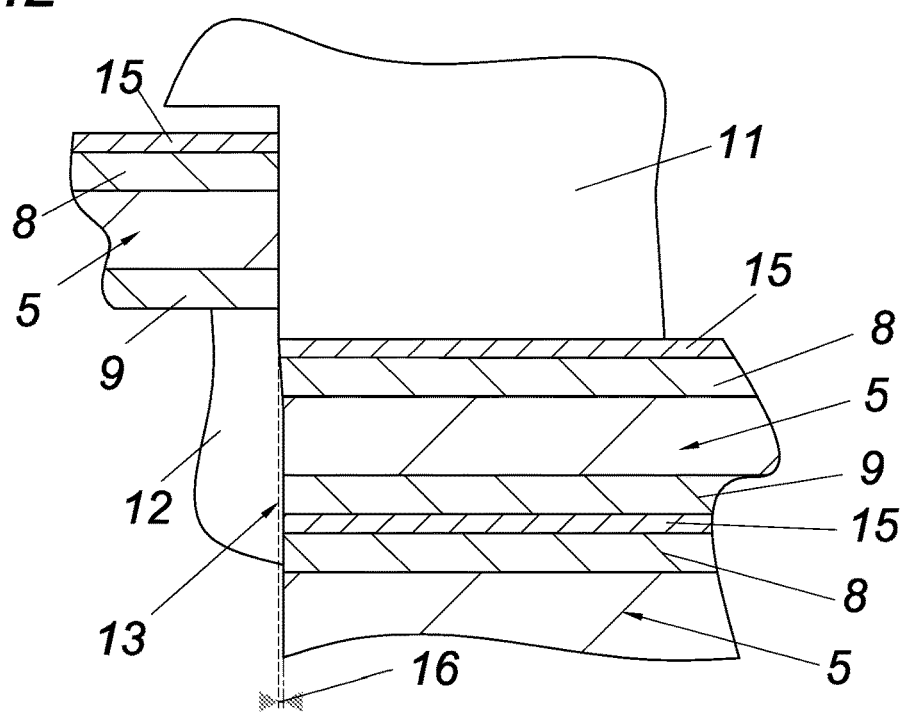
FIG. 2 is a fragmentary enlarged view of FIG. 1.

In FIG. 1, as an example, an apparatus 1 is shown with which the method of the invention for connecting sheet metal parts 2 to form a laminated core 3 is performed. From a coil 4, a sheet metal strip 5 is paid out, which on both sides 6, 7 of the strip, over the full surface, has a curable polymer adhesive coating 8, 9 of bonding varnish. From this sheet metal strip 5, sheet metal parts 2 are stamped out with the aid of a separator mechanism 10. Because there is an adhesive layer 8, 9 on each of the two sides 6, 7 of the strip, the stamped-out sheet metal parts 2 can be provided one above the other, with their adhesive-coated sides facing one another, so the sheet metal parts do not have to be inverted. Under the pressure of the upper tool 11, the sheet metal parts 2 are joined together in materially bonded fashion to form a laminated core 3; for guiding the sheet metal parts 2, a line 13 is provided in the lower tool 12. The laminated cores 3 that leave the line 13 are sufficiently strongly connected mechanically because, in contrast to the prior art, a mixture 14 that contains both water and a thermoplastic adhesion promoter 15 is provided on the adhesive layer 8, of the adhesive layers 8, 9 facing one another in the materially bonded connection of the sheet metal parts 2, as can be seen particularly from FIG. 2. Polyvinyl alcohol is used as the adhesion promoter 15.

For applying the adhesion promoter 15, the apparatus 1 has a spray device 17, which applies the mixture 14 to the adhesive layer 8 of the sheet metal strip 5. Advantageously, the mixture of water and adhesion promoter 15 is used to produce an adhesion promoter layer of nanoscale thickness. The water solubility of the adhesion promoter 15 additionally contributes to reducing the layer thickness of the adhesion promoter layer.

Because the mixture 14 is dried with a drying device 18 downstream of the spray device 17, a layer thickness that remains constant even though the apparatus 1 is in constant motion is ensured, thus ensuring replicably mechanically strong laminated cores 3.

For a fast course of the method, the mixture 14 is applied to the sheet metal strip 5 before the sheet metal parts 2 are separated. The course of the method can be made even faster by activating the adhesion promoter 15 and the adhesive layers 8, 9 before the sheet metal part 2 is separated from the sheet metal strip 5. As FIG. 1 shows, this method step takes place between two separation steps that are performed on the sheet metal strip 5. Specifically, parts 19 are also separated from the sheet metal strip 5 by the separator mechanism 10 beforehand, in order thereby to prepare the sheet metal strip 5 for the final separation of the sheet metal parts 2.

The comparatively reactive adhesion promoter 15 is activated immediately prior to the materially bonded connection of the sheet metal parts 2, in that a heating device 20 heats the sheet metal strip 5 to 100° Celsius. Upstream of the heating device 20, an activation device 21 is provided, which serves to activate the adhesive coating 8, 9—for instance by subjecting these layers 8, 9 to hot steam. It is also conceivable for the adhesive coatings 8, 9 and the adhesion promoter 15 to be activated simultaneously by the heating device 20.

Simple engineering conditions result because the sheet metal parts 2 in the line 13 of the lower tool 12 are stacked one above the other in column form, namely directly below the upper tool 11 of the separator mechanism 10. The upper tool 11, which in particular has a nonstick coating (such as polytetrafluoroethylene), by its stamping motion 22, exerts a pressure on the sheet metal parts 2 stacked in column form in the line 13. Since the line 13 exerts a resistance to the further migration of sheet metal parts 2 in the line 13 on the order of a packet brake 16, joining of the sheet metal parts 2 under pressure is ensured. A sturdy, materially bonded connection is thus created.

Figure 3:
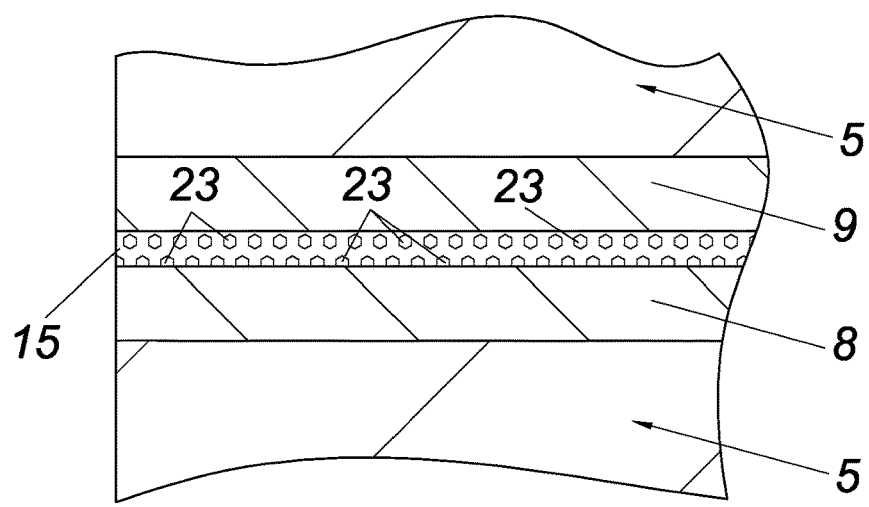
FIG. 3 is a detailed view of the materially bonded connection between two sheet metal parts of the laminated core of FIG. 1.

Furthermore, this connection develops in mechanically heavy-duty fashion as a result of fillers 23, namely kaolin, in the mixture 14, which fillers 23 are located in the adhesion promoter 15, as can be learned from FIG. 3. This mechanical heavy-duty capability of the materially bonded connection between the sheet metal parts 2 is further enhanced by adding a water-soluble reaction accelerator, namely 2-methylimidizole, and a water-soluble cross-linking agent, namely partly etherified melamine resin, to the mixture. A sturdy laminated core 3 is thus created.

In general, it is noted that by activation of the bonding varnish and/or of the adhesion promoter, physical bonding becomes possible. In it, the relevant substance becomes sticky, so that a materially bonded connection can be built up. A bond that hardens chemically need not necessarily ensue. Advantageously, bonding varnish and adhesion promoter upon activation are subjected simultaneously to a temperature that is capable of activating both substances. A temperature of 70 to 100° C., with a range of ±10% is conceivable.

In FIG. 1, in the apparatus 1, coating rollers 23, 24 can also be seen, which as a function of a control and regulating device, not further shown, of the apparatus 1, apply a parting coating to the sheet metal strip 5, namely to its polymer adhesive layer 8. This can be done for instance with the aid of a laminated-on parting film. This coating is done in those regions of the sheet metal strip 5 such that after a thus-coated sheet metal part has been separated, this sheet metal part can be more easily parted from an adjacent laminated core 3 easier. For instance, because this sheet metal part, with its coating on the outside, forms a first or a last sheet metal part of a laminated core 3. It is furthermore conceivable that this sheet metal part is located between adjacent laminated cores 3, and thus the laminated cores 3 can be parted from one another more easily.

Via the control and regulating device, the drive of the coating rollers can be adjusted to suit the feeding speed of the apparatus, which guarantees reliable lamination of the sheet metal strip with a foil. A pressure- and temperature-stable foil is preferred, in order to ensure a replicable method.

The invention claimed is:

1. A method for connecting sheet metal parts to form a laminated core, comprising:
   separating sheet metal parts from a sheet metal strip having an at least regional curable polymer adhesive layer;
   positioning the sheet metal parts one above the other, with adhesive-coated sides toward one another;
   providing a mixture including water and a thermoplastic and/or cross-linkable adhesion promoter on at least one of the adhesive layers facing one another;
   drying mixture; and
   after drying the mixture, connecting the sheet metal parts to form a laminated core under pressure in a materially bonded fashion.

2. The method of claim 1, wherein the adhesion promoter is water-soluble and/or the adhesive layer comprises bonding varnish and/or the adhesive layer is provided on both sides of the sheet metal strip and/or the sheet metal parts are separated from the sheet metal strip by stamping.

3. The method of claim 1, comprising applying the mixture to the sheet metal strip before the sheet metal parts are separated.

4. The method of claim 1, comprising activating the adhesion promoter immediately prior to connecting the sheet metal parts in a materially bonded fashion.

5. The method of claim 1, comprising activating the adhesion promoter and the adhesive layer simultaneously.

6. The method of claim 1, comprising separating the parts from the sheet metal strip multiple times, and activating the adhesion promoter and/or the adhesive layer prior to separating at least one of the sheet metal parts from the sheet metal strip.

7. The method of claim 1, comprising separating the sheet metal parts from the sheet metal strip with the sheet metal strip having an adhesive layer provided over a full surface of both sides of the sheet metal strip.

8. The method of claim 1, comprising stacking the sheet metal parts one above the other in column form below a separator mechanism, to connect the sheet metal parts to one another in a materially bonded fashion.

9. The method of claim 8, comprising stacking the sheet metal parts one above another in a line that exerts a resistance to migration of the sheet metal parts in the line.

10. The method of claim 1, wherein the adhesion promoter comprises polyvinyl alcohol, carboxymethylcellulose, or an amine with a cross-linking reaction.

11. The method of claim 1, comprising adding fillers to the mixture.

12. The method of claim 1, comprising adding at least one additive to the mixture, wherein the additive is selected from the group consisting of: a water soluble reaction accelerator, 2-methylimidizole, a melamine-based, water-soluble cross-linker, partly etherified melamine resin, a cross-linking agent that is dispersible in water with an isocyanate base, an isocyanate-based cross-linking agent, and isophorone diisocyanate.

* * * * *